United States Patent
Kamp et al.

(10) Patent No.: US 9,212,756 B2
(45) Date of Patent: Dec. 15, 2015

(54) HIGH PRESSURE CHECK VALVE FLANGE JOINT

(71) Applicant: Hamilton Sundstrand Corporation, Windsor Locks, CT (US)

(72) Inventors: Josh Kamp, Glastonbury, CT (US); Ray Garner, Chula Vista, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 197 days.

(21) Appl. No.: 13/920,586

(22) Filed: Jun. 18, 2013

(65) Prior Publication Data

US 2014/0366966 A1 Dec. 18, 2014

(51) Int. Cl.
*F16K 15/03* (2006.01)
*F16K 27/02* (2006.01)

(52) U.S. Cl.
CPC ........... *F16K 27/0227* (2013.01); *F16K 15/038* (2013.01); *F16L 2201/10* (2013.01); *Y10T 137/7504* (2015.04); *Y10T 137/7837* (2015.04); *Y10T 137/7854* (2015.04); *Y10T 137/7857* (2015.04)

(58) Field of Classification Search
CPC ............ F16K 27/0227; F16K 27/0218; F16K 27/0209; F16K 15/038; F16L 2201/10; F16L 23/00–23/24; Y10T 137/7837; Y10T 137/7857; Y10T 137/7504; Y10T 137/7854
USPC ............ 137/512.1, 515.7, 515.5, 512, 512.5, 137/454.2, 515; 285/363–368, 406, 420, 285/421
See application file for complete search history.

(56) References Cited

U.S. PATENT DOCUMENTS

| 3,884,508 A | * | 5/1975 | Jones ............................. 285/31 |
| 4,148,338 A | * | 4/1979 | Skoli ........................... 137/515.7 |
| 5,368,069 A | | 11/1994 | Felber |
| 2012/0118419 A1 | | 5/2012 | Murray |
| 2012/0125453 A1 | | 5/2012 | Murray |

OTHER PUBLICATIONS

European Search Report dated Jun. 5, 2015, for corresponding European Application No. 14165361.8.

* cited by examiner

*Primary Examiner* — Craig Schneider
*Assistant Examiner* — Josephine Trinidad-Borges
(74) *Attorney, Agent, or Firm* — Kinney & Lange, P.A.

(57) ABSTRACT

A valve flange joint includes a valve flange and first and second duct flanges. The first and second duct flanges include respective first and second mating portions. The first mating portion includes a first duct rim, a first duct face in contact with a first face of the valve flange, and a first slot. The second mating portion includes a second duct face in contact with a second face of the valve flange, and a second rim. In an embodiment, the valve flange includes a tab that extends in an axial direction through the first slot and includes an inner surface radially inward of an outermost portion of the second mating portion. In another embodiment, a first thickness is defined between the first flange face and the second flange face. Second and third thicknesses are also defined for the first and second mating portions. The three thicknesses are substantially similar.

18 Claims, 4 Drawing Sheets

HIGH PRESSURE CHECK VALVE FLANGE JOINT

BACKGROUND

The present invention is related to check valves and in particular to check valve flange joints.

Fluid check valves are known and commonly used in aircraft gas turbine engines. Check valves allow fluid to flow in only one direction, denying fluid flow in the opposite direction. Check valves may be utilized in harsh environments that include high fluid pressures and high temperatures. In these environments, the stresses placed on the mechanical parts of the check valve can be great. It is desirable to increase the strength of check valve parts for use in high pressure and high temperature environments.

It is also important to ensure that a check valve is properly installed. If installed backward, the check valve will block fluid flow in the desired direction, while allowing fluid flow in the undesired direction. This is important, for example, in applications that utilize check valves between high pressure components and low pressure components of a gas turbine engine. Because of this, safeguards that ensure proper installation of a check valve are desirable.

SUMMARY

In an embodiment, a valve flange joint oriented about a centerline includes an annular valve flange, an annular first duct flange, and an annular second duct flange. The annular valve flange includes a tab, a first valve flange face and a second valve flange face. The annular first duct flange includes a first mating portion. The first mating portion includes a rim, a first duct face in contact with the first valve flange face, and a first slot that extends through the rim and the first mating portion. The annular second duct flange includes a second duct mating portion. The second duct mating portion includes a face in contact with the second valve flange face, and a second rim. The tab extends in an axial direction through the first slot. An inner surface of the tab is radially inward of an outermost portion of the second mating portion.

In another embodiment, a valve flange joint includes an annular valve flange, an annular first duct flange, and an annular second duct flange. The annular valve flange is oriented about a centerline and includes a first valve flange face and a second valve flange face. The first and second valve flange faces extend in a radial direction perpendicular to the centerline and a first thickness is defined as a minimum distance between the first flange face and the second flange face. The annular first duct flange is oriented about the centerline and includes a first mating portion. The first mating portion includes a first outer surface and a first duct face in contact with the first valve flange face that extends between a first seal groove and a first rim. A second thickness is defined as the minimum distance between a shoulder of the first seal groove and the first outer surface. The annular second duct flange is oriented about the centerline and includes a second mating portion. The second mating portion includes a second outer surface and a second duct face in contact with the second valve flange face that extends between a second seal groove and a second rim. A third thickness is defined as the minimum distance between a shoulder of the second seal groove and the second outer surface. A ratio between the first thickness and the second thickness is between 0.8:1.0 and 1.2:1.0, and a ratio between the first thickness and the third thickness is between 0.8:1.0 and 1.2:1.0.

DETAILED DESCRIPTION

A flange joint for a check valve assembly is disclosed herein that includes two annular duct flanges and an annular check valve flange of similar thickness. A check valve for use in, for example, a gas turbine engine is oriented about a centerline. An annular check valve flange connected to the check valve is seated between first and second annular duct flanges. The outer profile of the duct flanges form a flange joint outer profile that may be, for example, defined with respect to an industry standard such as AS1895 which is an SAE Aerospace Standard defining the requirements for grooved clamp couplings, flanges, and seals suitable for joining high pressure and high temperature ducting in aircraft bleed air systems. Each duct flange includes a mating portion that extends radially outward from the centerline to mate with the check valve flange. Each mating portion includes a rim. The check valve flange includes an outer end that is radially inward of the mating portion rims. The mating portion rims interface to provide a tight clearance that pilots the check valve flange. The check valve flange includes an outer tab that ensures that the check valve is installed in the proper direction and proper position. The mating portion rims include slots for the check valve flange tab. The flange tab includes an inner surface that is radially inward of the outermost portion of the second duct flange. In this way, the check valve is only installable in one direction. The tab extends axially beyond hinges of an annular coupling, which provides visual indication that the check valve is installed. The first and second mating portions and the check valve flange are all of substantially equal thickness. This provides substantially equal strength for the three flanges. By providing equal strength for the three flanges, the check valve can perform better in high temperature and high pressure conditions such as, for example, approximately 1500 pounds per square inch gauge (psig) and 1300 degrees Fahrenheit.

Figure 1A:
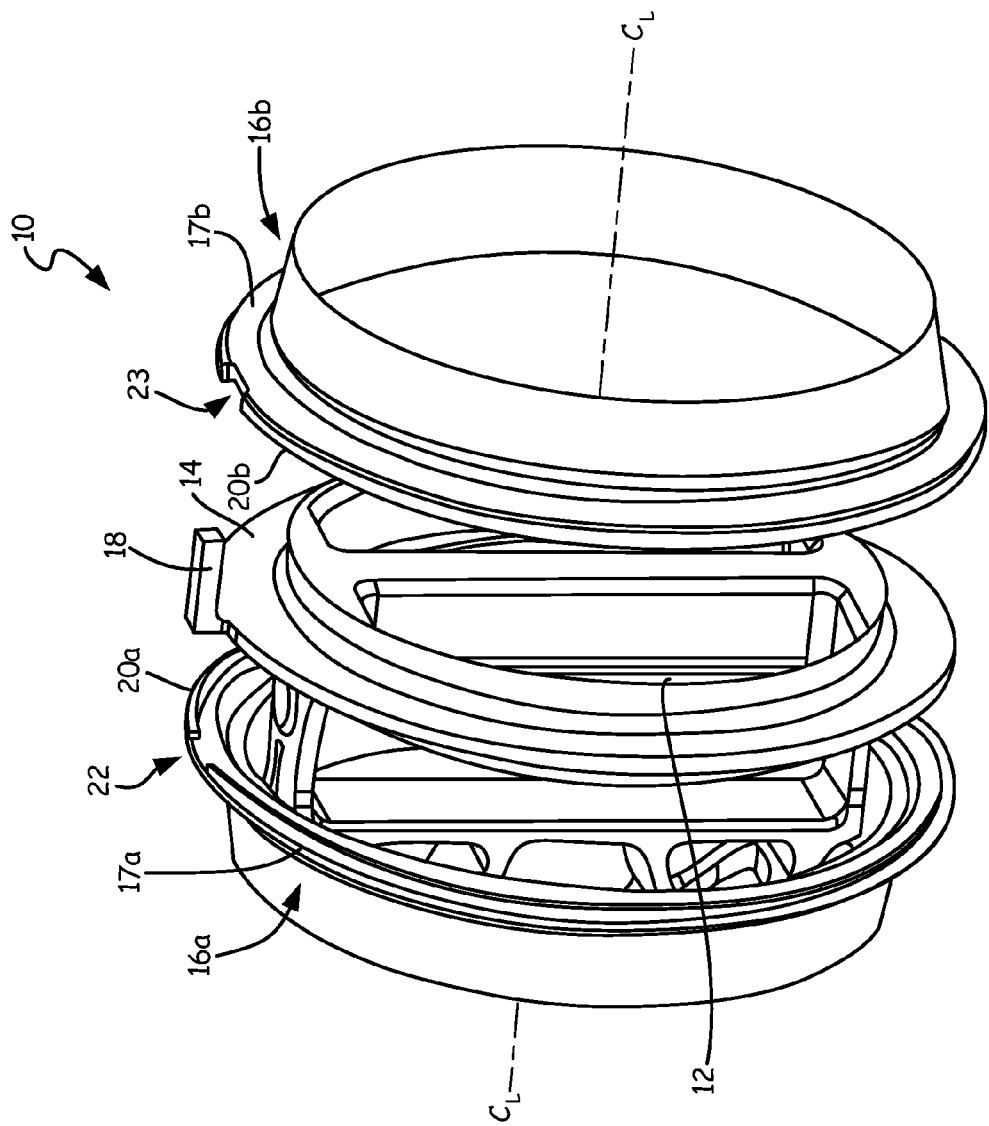
FIGS. 1A and 1B are an exploded view and a perspective view of check valve assembly, respectively
Figure 1B:
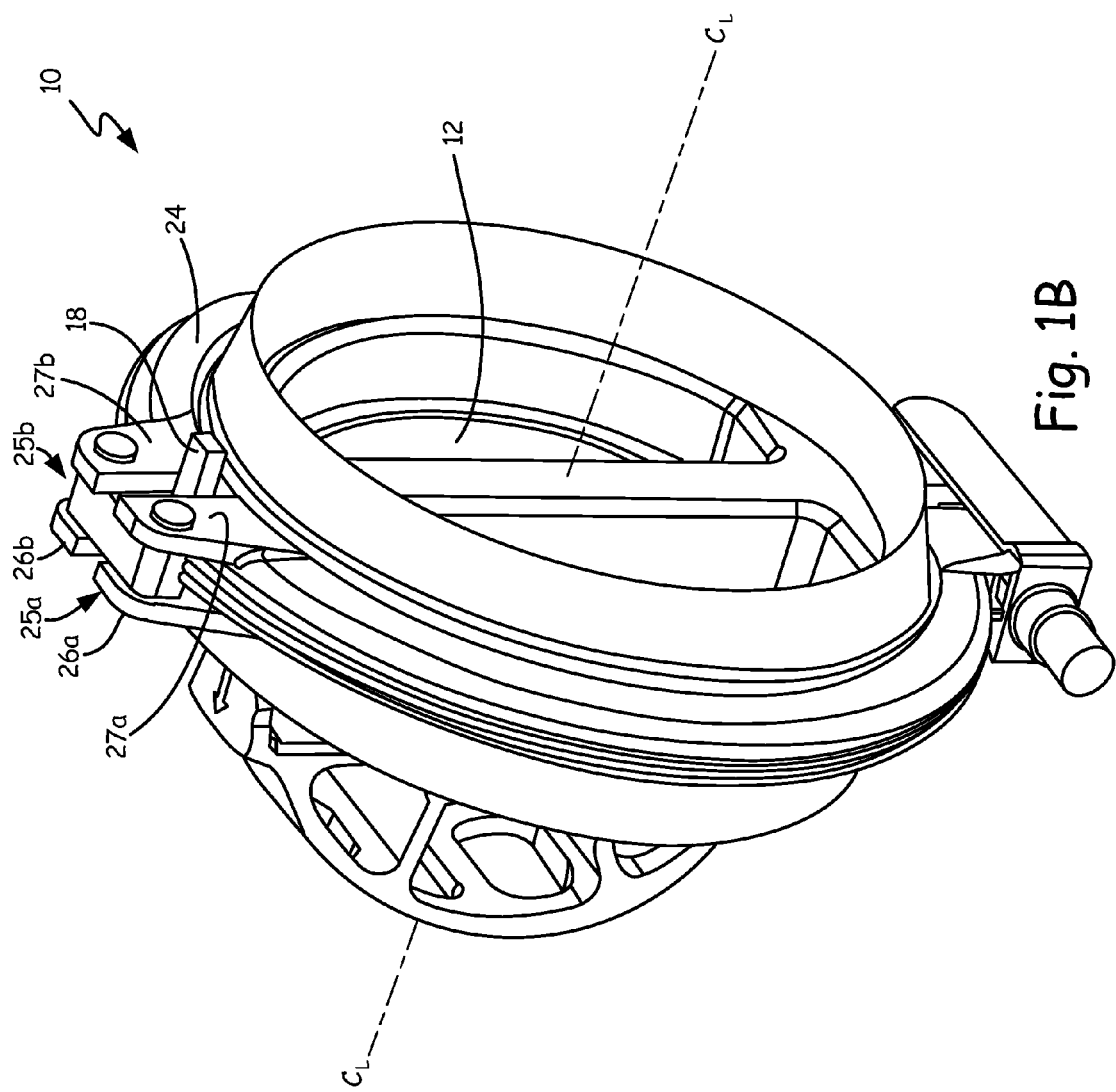

FIGS. 1A and 1B are an exploded view and a perspective view of check valve assembly 10, respectively. Check valve assembly 10 is oriented annularly about centerline $C_L$ and includes check valve 12, which may be any known check valve. Check valve 12 includes check valve flange 14 which extends radially outward from centerline $C_L$. Check valve assembly 10 further includes first and second duct flanges 16a and 16b. In an embodiment, first and second duct flanges 16a and 16b may be, for example, outlet and inlet duct flanges, respectively. First and second duct flanges 16a and 16b include mating portions 17a and 17b. Mating portions 17a and 17b extend radially outward from centerline $C_L$ to mate with check valve flange 14. Check valve flange 14 includes tab 18 to ensure that check valve 12 is installed in the proper direction and position. Mating portions 17a and 17b include respective rims 20a and 20b. Rim 20a includes slot 22 to receive tab 18. Slot 22 does not extend through mating portion 17a. Rim 20b includes slot 23 to receive tab 18. Slot 23 extends through mating portion 17b to receive tab 18. Mating portions 17a and 17b along with check valve flange 14 form a flange joint. Coupling 24 (shown in FIG. 1B) fits over the flange joint and is implemented to clamp check valve flange 14 (not visible in FIG. 1B) between mating portions 17a and 17b. Coupling 24 includes hinges 25a and 25b. Hinge 25a includes hinge faces 26a and 27a. Hinge 25b includes hinge faces 26b and 27b. In an embodiment, coupling 24 may be implemented to conform with, for example, SAE industry standard AS1895.

Tab 18 extends axially between and beyond hinge faces 27a and 27b of coupling 14 to provide a visual indication that check valve 12 is installed within check valve assembly 10. Hinge faces 27a and 27b may be, for example, coplanar. Tab 18 is also used to clock check valve 12 within check valve assembly 10. Because tab 18 interfaces with slots 22 and 23, check valve 12 is clocked to a single desired orientation within check valve assembly 10.

Figure 2:
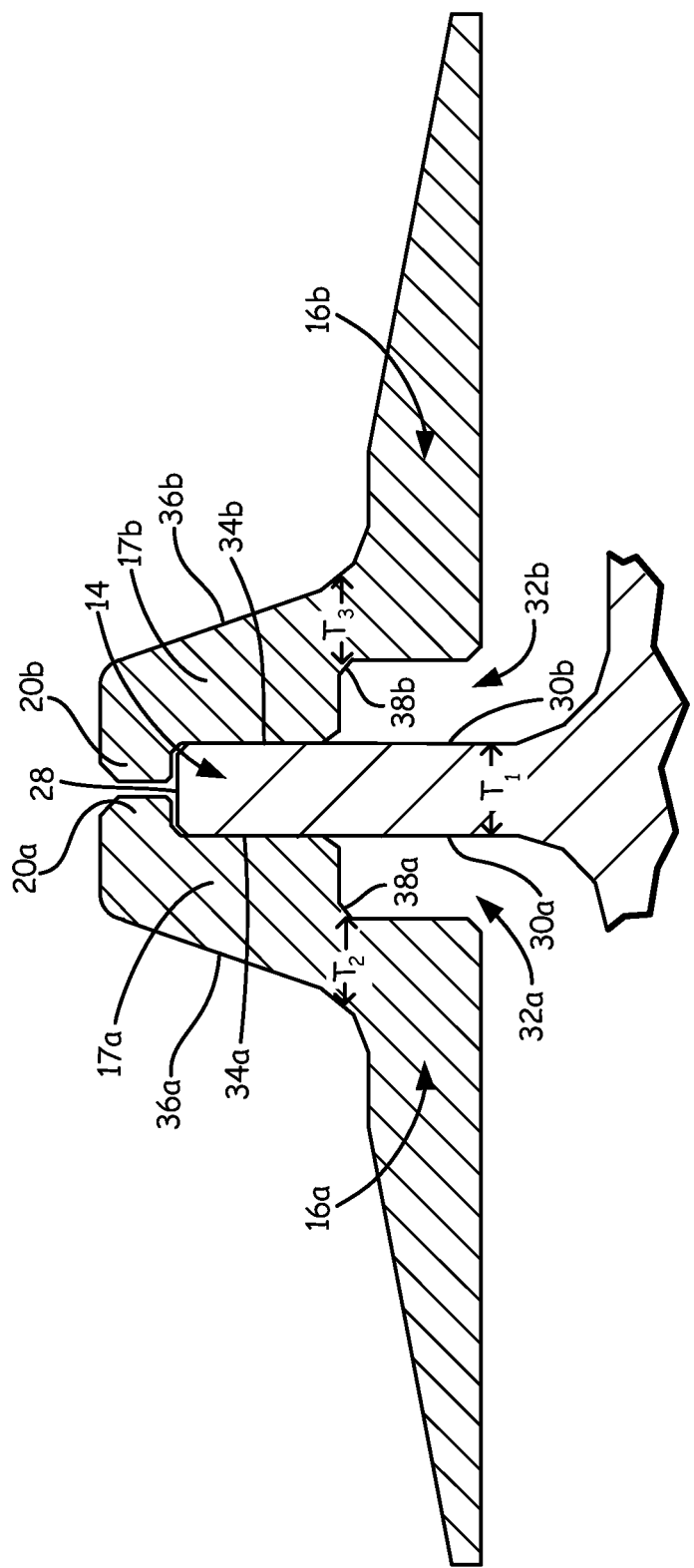
FIG. 2 is a cross-sectional view of a check valve flange and duct flanges through a point circumferentially offset from a check valve flange tab.

FIG. 2 is a cross-sectional view of check valve flange 14 and duct flanges 16a and 16b taken at a point circumferentially offset from tab 18. Check valve flange 14 includes outer surface 28, and valve flange faces 30a and 30b. A thickness $T_1$ is defined as a minimum distance between faces 30a and 30b. In an embodiment, $T_1$ may be, for example, approximately 0.1 inches. By maintaining thickness $T_1$ for the entire radial length of flange 14, the strength of flange 14 is maximized.

Duct flanges 16a and 16b include seal grooves 32a and 32b to receive seals (not shown). The seals are annular about center line $C_L$ and ensure that there is little to no fluid leakage at the interface between check valve flange 14 and duct flanges 16a and 16b. Flange mating portions 17a and 17b include faces 34a and 34b, and outer surfaces 36a and 36b, respectively. When check valve flange 14 is installed, face 30a is in contact with face 34a, and face 30b is in contact with face 34b. Outer surface 28 is adjacent to the inner surfaces of rims 20a and 20b. The faces of rims 20a and 20b are adjacent to one another. The faces of rims 20a and 20b may provide a tight radial clearance for outer surface 28 to pilot check valve flange 14 into a proper position.

Outer surfaces 36a and 36b may be substantially frustoconical in order to create a flange joint outer profile that conforms to, for example, SAE industry standard AS1895. Thickness $T_2$ is defined as a distance between outer surface 36a and shoulder 38a of seal groove 32a. This may be the minimum distance between shoulder 38a and outer surface 36a. Thickness $T_3$ is defined as a distance between outer surface 36b and shoulder 38b of seal groove 32b. This may be the minimum distance between shoulder 38b and outer surface 36b. Thicknesses $T_1$, $T_2$, and $T_3$ are substantially similar to maximize the distributed strength of each of the three flanges 14, 16a and 16b, respectively. In an embodiment, a ratio between Thickness $T_1$ and $T_2$ may be, for example, between 0.8:1.0 and 1.2:1.0. A ratio between thicknesses $T_1$ and $T_3$ may be, for example, between 0.8:1.0 and 1.2:1.0.

Figure 3:
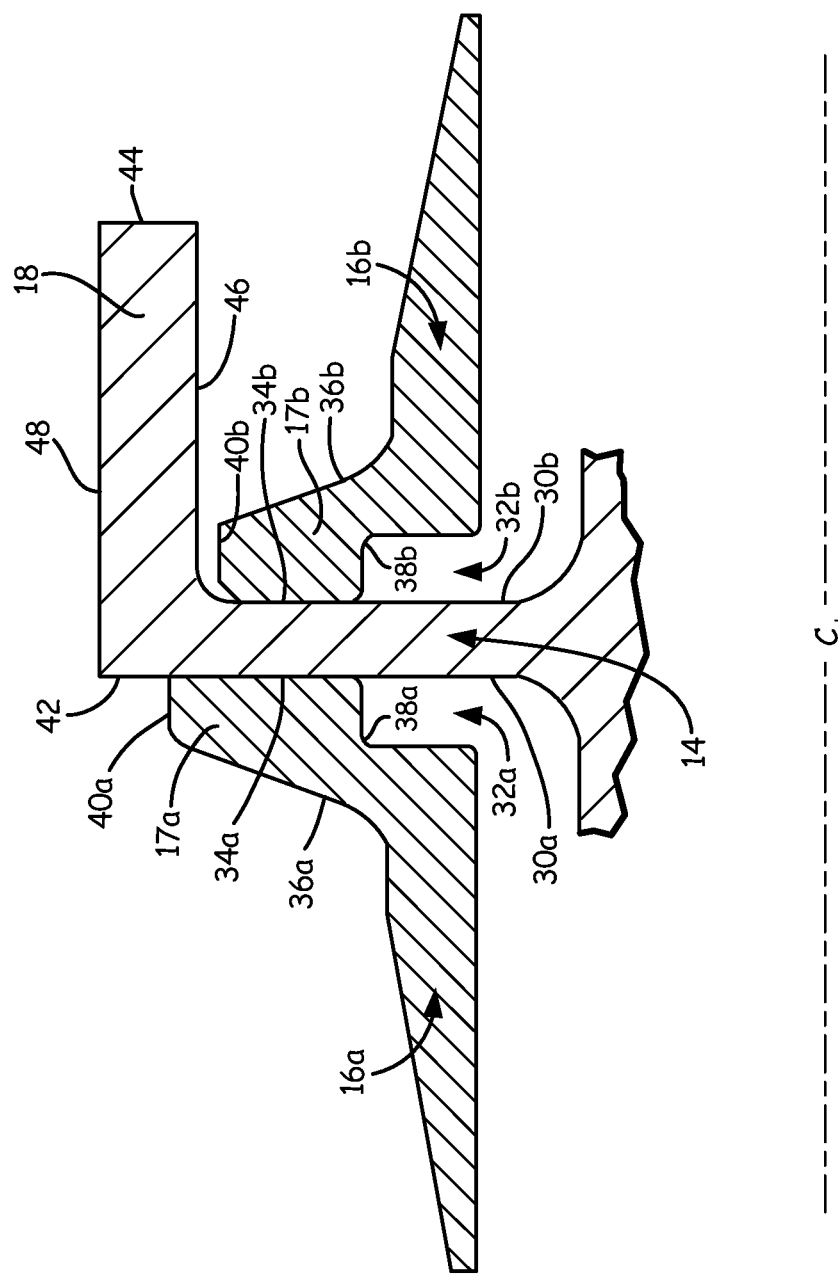
FIG. 3 is a cross-sectional view of a check valve flange and duct flanges taken through a check valve flange tab.

FIG. 3 is a cross-sectional view of check valve flange 14 and duct flanges 16a and 16b taken through tab 18. Because of slot 22, face 34a of flange mating portion 17a extends to outer surface 40a and is in contact with face 30a of flange 14 and face 42 of tab 18 from seal groove 32a to outer surface 40a. Outer surface 40a is the outermost portion of mating portion 17a. Outer surface 40b is the base of slot 23 as shown in FIG. 1A and is radially inward from the outermost surface of flange mating portion 17b as shown in FIG. 2. Tab 18 includes faces 42 and 44, inner surface 46 and outer surface 48. Face 42 is coplanar with face 30a of flange 14 and extends radially outward from face 30a to tab outer surface 48. Inner surface 46 is adjacent to surface 40b. Tab 18 extends axially from face 42 to face 44. Face 42 is axially between hinges 26a and 26b, and face 44 extends axially beyond hinge faces 27a and 27b of FIG. 1B.

Tab 18 is utilized to ensure that check valve 12 of FIGS. 1A and 1B is installed in the proper direction and proper position. Inner surface 46 is radially inward of outermost surface 40a of duct flange 16a. Because the distance from centerline $C_L$ to outermost surface 40a is greater than the distance from centerline $C_L$ to inner surface 46 of tab 18, check valve 12 cannot be installed in the opposite direction. Further, because face 44 extends axially beyond hinge faces 27a and 27b, a visual indication is provided to indicate that check valve 12 is installed. Tab 18 also provides clocking for check valve 12. Because tab 18 interfaces with slots 22 and 23, check valve 12 can only be oriented in one position about centerline $C_L$ when installed. This way, tab 18 provides safeguards to prevent improper installation of check valve 12 while also providing indication that check valve 12 is installed.

If check valve 12 is not installed within assembly 10, coupling 24 (shown in FIG. 1A) will not properly clamp the flange joint when coupling 24 is fully circumferentially tightened. When flange 14 is not present, faces 34a and 34b will be in contact. Because $T_1$, $T_2$, and $T_3$ are of substantially similar thickness, the total thickness of the flange joint will be decreased enough that coupling 24 will not fully clamp the flange joint when coupling 24 is fully circumferentially tightened. This prevents mating flanges 17a and 17b from being rigidly connected, which allows air to leak from assembly 10 between faces 34a and 34b. The loose fit of coupling 24 when flange 14 is not present provides further indication, in addition to the visual absence of tab 18, that check valve 12 is not installed within assembly 10.

The following are non-exclusive descriptions of possible embodiments of the present invention.

A valve flange joint oriented about a centerline includes, among other things: an annular valve flange, an annular first duct flange, and an annular second duct flange. The annular valve flange includes a tab, a first valve flange face and a second valve flange face. The annular first duct flange includes a first mating portion. The first mating portion includes a rim, a first duct face in contact with the first valve flange face, and a first slot that extends through the rim and the first mating portion. The annular second duct flange includes a second duct mating portion. The second duct mating portion includes a face in contact with the second valve flange face, and a second rim. The tab extends in an axial direction through the first slot. An inner surface of the tab is radially inward of an outermost portion of the second mating portion.

The valve flange joint of the preceding paragraph can optionally include, additionally and/or alternatively, any one or more of the following features, configurations and/or additional components:

A first thickness is defined as a minimum distance between the first valve flange face and the second valve flange face. The first mating portion includes a first outer surface and a first groove in the first duct face. A second thickness is defined as a minimum distance between a shoulder of the first groove and the first outer surface. The second mating portion includes a second outer surface and a second groove in the second duct face. A third thickness is defined between a shoulder of the second groove and the second outer surface. A ratio between the first thickness and the second thickness is between 0.8:1.0 and 1.2:1.0, and a ratio between the first thickness and the third thickness is between 0.8:1.0 and 1.2:1.0.

A first outer surface of the first mating portion and a second outer surface of the second mating portion are both of a frustoconical shape. The first outer surface and the second outer surface form a flange joint outer profile.

An annular coupling interfaces over the flange joint outer profile to clamp the valve flange between the first mating portion and the second mating portion.

The annular coupling includes first and second hinges. The first hinge includes a first hinge face. The second hinge includes a second hinge face coplanar with the first hinge face. The tab extends axially between the first and second hinges beyond the first and second hinge faces.

The coupling does not fully clamp the first and second mating portions when the valve flange is not present.

The second rim includes a second slot, and wherein a first tab face extends through the second slot, and wherein the first tab face is coplanar with the second valve flange face.

A valve flange joint includes, among other things: an annular valve flange, an annular first duct flange, and an annular second duct flange. The annular valve flange is oriented about a centerline and includes a first valve flange face and a second valve flange face. The first and second valve flange faces extend in a radial direction perpendicular to the centerline and a first thickness is defined as a minimum distance between the first flange face and the second flange face. The annular first duct flange is oriented about the centerline and includes a first mating portion. The first mating portion includes a first outer surface and a first duct face in contact with the first valve flange face that extends between a first seal groove and a first rim. A second thickness is defined as the minimum distance between a shoulder of the first seal groove and the first outer surface. The annular second duct flange is oriented about the centerline and includes a second mating portion. The second mating portion includes a second outer surface and a second duct face in contact with the second valve flange face that extends between a second seal groove and a second rim. A third thickness is defined as the minimum distance between a shoulder of the second seal groove and the second outer surface. A ratio between the first thickness and the second thickness is between 0.8:1.0 and 1.2:1.0, and a ratio between the first thickness and the third thickness is between 0.8:1.0 and 1.2:1.0.

The valve flange joint of the preceding paragraph can optionally include, additionally and/or alternatively, any one or more of the following features, configurations and/or additional components:

The first outer surface and the second outer surface are both of a frustoconical shape. The first outer surface and the second outer surface form a flange joint outer profile.

An annular coupling that interfaces over the flange joint outer profile to clamp the valve flange between the first mating portion and the second mating portion.

The coupling does not fully clamp the first and second mating portions when the valve flange is not present.

The valve flange further includes a tab. The tab includes an inner surface parallel to the centerline that is radially inward of a radially outermost portion of the second mating portion.

The annular coupling includes a first hinge and a second hinge. The first hinge includes a first hinge face and the second hinge includes a second hinge face coplanar with the first hinge face. The tab extends axially beyond the first and second hinge faces.

The first mating portion includes a first slot, and wherein the tab extends axially through the first slot.

The second rim includes a second slot. A tab face of the tab extends radially through the second slot. The tab face is coplanar with the second valve flange face.

A check valve assembly oriented about a centerline includes, among other things: an annular valve flange, an annular first duct flange, and an annular second duct flange. The annular valve flange includes a tab, a first valve flange face and a second valve flange face. The first thickness is defined as a minimum distance between the first valve flange face and the second valve flange face. The annular first duct flange includes a first mating portion. The first mating portion includes a first outer surface, a first duct rim, a first duct face in contact with the first valve flange face, and a first slot. The first duct face includes a first groove. A second thickness is defined as a minimum distance between a shoulder of the first groove and the first outer surface. The annular second duct flange includes a second mating portion. The second mating portion includes a second outer surface, a second duct face in contact with the second valve flange face, and a second rim. The second duct face includes a second groove. A third thickness is defined between a shoulder of the second groove and the second outer surface. The tab extends in an axial direction through the first slot. An inner surface of the tab is radially inward of an outermost portion of the second mating portion. A ratio between the first thickness and the second thickness is between 0.8:1.0 and 1.2:1.0, and a ratio between the first thickness and the third thickness is between 0.8:1.0 and 1.2:1.0.

The check valve assembly of the preceding paragraph can optionally include, additionally and/or alternatively, any one or more of the following features, configurations and/or additional components:

The first and second outer surfaces are both of a frustoconical shape and form a flange joint outer profile.

An annular coupling interfaces over the flange joint outer profile to clamp the valve flange between the first mating portion and the second mating portion.

The annular coupling includes first and second hinges. The first hinge includes a first hinge face and the second hinge includes a second hinge face coplanar with the first hinge face. The tab extends axially between the first and second hinges beyond the first and second hinge faces.

The second rim includes a second slot. A first tab face extends radially through the second slot. The first tab face is coplanar with the second valve flange face.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A valve flange joint oriented about a centerline, the valve flange joint comprising:
   an annular valve flange that includes a tab portion, and a body portion having a first valve flange face and a second valve flange face;
   an annular first duct flange that includes a first seal portion and a first mating portion, wherein the first seal portion comprises a first groove configured to receive a seal between the first duct flange and the first valve flange face, and wherein the first mating portion includes a rim, a first duct face in contact with the first valve flange face, and a first slot that extends through the rim and the first mating portion; and
   an annular second duct flange that includes a second seal portion and a second duct mating portion, wherein the second seal portion comprises a second groove configured to receive a seal between the second duct flange and the second valve flange face, and wherein the second duct mating portion includes a second duct face in contact with the second valve flange face, and a second rim;

wherein the annular valve flange body portion extends radially outward from the centerline along the first and second seal portions and the first and second duct faces;

wherein a first thickness is defined as a minimum distance between the first valve flange face and the second valve flange face, and wherein the first thickness is maintained throughout an entire radial length of the annular valve flange body portion; and wherein the tab portion extends in an axial direction through the first slot, and wherein an inner surface of the tab portion is radially inward of an outermost portion of the second mating portion.

2. The valve flange joint of claim 1, further comprising:
wherein the first mating portion includes a first outer surface, and wherein a second thickness is defined as a minimum distance between a shoulder of the first groove and the first outer surface;
wherein the second mating portion includes a second outer surface, and wherein a third thickness is defined between a shoulder of the second groove and the second outer surface; and
wherein a ratio between the first thickness and the second thickness is between 0.8:1.0 and 1.2:1.0, and a ratio between the first thickness and the third thickness is between 0.8:1.0 and 1.2:1.0.

3. The valve flange joint of claim 1, wherein a first outer surface of the first mating portion and a second outer surface of the second mating portion are both of a frustoconical shape, and wherein the first outer surface and the second outer surface form a flange joint outer profile.

4. The valve flange joint of claim 3, further comprising an annular coupling that interfaces over the flange joint outer profile to clamp the valve flange between the first mating portion and the second mating portion.

5. The valve flange joint of claim 4, wherein the annular coupling includes first and second hinges, wherein the first hinge includes a first hinge face, and wherein the second hinge includes a second hinge face coplanar with the first hinge face, and wherein the tab portion extends axially between the first and second hinges beyond the first and second hinge faces.

6. The valve flange joint of claim 1, wherein the second rim includes a second slot, and wherein a first tab face of the tab portion extends through the second slot, and wherein the first tab face is coplanar with the second valve flange face.

7. A valve flange joint comprising:
an annular valve flange oriented about a centerline and having a body portion with a first valve flange face and a second valve flange face, wherein the first and second valve flange faces extend in a radial direction perpendicular to the centerline and a first thickness is defined as a minimum distance between the first flange face and the second flange face, and wherein the first thickness is maintained throughout an entire radial length of the annular valve flange body portion;
an annular first duct flange oriented about the centerline and having a first seal portion and a first mating portion, wherein the first seal portion comprises a first groove configured to receive a seal between the first duct flange and the first valve flange face, and wherein the first mating portion includes a first outer surface and a first duct face in contact with the first valve flange face that extends between the first seal groove and a first rim, and wherein a second thickness is defined as the minimum distance between a shoulder of the first seal groove and the first outer surface; and
an annular second duct flange oriented about the centerline and having a second seal portion and a second mating portion, wherein the second seal portion comprises a second groove configured to receive a seal between the second duct flange and the second valve flange face, and wherein the second mating portion includes a second outer surface and a second duct face in contact with the second valve flange face that extends between the second seal groove and a second rim, and wherein a third thickness is defined as the minimum distance between a shoulder of the second seal groove and the second outer surface;
wherein the annular valve flange body portion extends radially outward from the centerline along the first and second seal portions and the first and second duct faces; and
wherein a ratio between the first thickness and the second thickness is between 0.8:1.0 and 1.2:1.0, and a ratio between the first thickness and the third thickness is between 0.8:1.0 and 1.2:1.0.

8. The valve flange joint of claim 7, wherein the first outer surface and the second outer surface are both of a frustoconical shape, and wherein the first outer surface and the second outer surface form a flange joint outer profile.

9. The valve flange joint of claim 8, further comprising an annular coupling that interfaces over the flange joint outer profile to clamp the valve flange between the first mating portion and the second mating portion.

10. The valve flange joint of claim 9, wherein the valve flange further includes a tab portion, the tab portion comprising an inner surface parallel to the centerline that is radially inward of a radially outermost portion of the second mating portion.

11. The valve flange joint of claim 10, wherein the annular coupling includes a first hinge and a second hinge, wherein the first hinge includes a first hinge face, and wherein the second hinge includes a second hinge face coplanar with the first hinge face, and wherein the tab portion extends axially beyond the first and second hinge faces.

12. The valve flange joint of claim 10, wherein the first mating portion includes a first slot, and wherein the tab portion extends axially through the first slot.

13. The valve flange joint of claim 10, wherein the second rim includes a second slot, and wherein a tab face of the tab portion extends radially through the second slot, and wherein the tab face is coplanar with the second valve flange face.

14. A check valve assembly oriented about a centerline, the check valve assembly comprising:
an annular valve flange that includes a tab portion, and a body portion having a first valve flange face and a second valve flange face, wherein a first thickness is defined as a minimum distance between the first valve flange face and the second valve flange face, and wherein the first thickness is maintained throughout an entire radial length of the annular valve flange body portion;
an annular first duct flange that includes a first seal portion and a first mating portion, wherein the first seal portion comprises a first groove configured to receive a seal between the first duct flange and the first valve flange face, and wherein the first mating portion includes a first outer surface, a first duct rim, a first duct face in contact with the first valve flange face, and a first slot, and wherein a second thickness is defined as a minimum distance between a shoulder of the first groove and the first outer surface; and an annular second duct flange that includes a second seal portion and a second mating portion, wherein the second seal portion comprises a second groove configured to receive a seal between the second duct flange and the second valve flange face, and wherein the second mating portion includes a second outer surface, a second duct face in contact with the second valve flange face, and a second rim, and wherein a third thickness is defined between a shoulder of the second groove and the second outer surface;

wherein the annular valve flange body portion extends radially outward from the centerline along the first and second seal portions and the first and second duct faces;

wherein the tab portion extends in an axial direction through the first slot, and wherein an inner surface of the tab portion is radially inward of an outermost portion of the second mating portion; and wherein a ratio between the first thickness and the second thickness is between 0.8:1.0 and 1.2:1.0, and a ratio between the first thickness and the third thickness is between 0.8:1.0 and 1.2:1.0.

15. The check valve assembly of claim 14, wherein the first and second outer surfaces are both of a frustoconical shape and form a flange joint outer profile.

16. The check valve assembly of claim 15, further comprising an annular coupling that interfaces over the flange joint outer profile to clamp the valve flange between the first mating portion and the second mating portion.

17. The check valve assembly of claim 16, wherein the annular coupling includes first and second hinges, wherein the first hinge includes a first hinge face, and wherein the second hinge includes a second hinge face coplanar with the first hinge face, and wherein the tab portion extends axially between the first and second hinges beyond the first and second hinge faces.

18. The check valve assembly of claim 17, wherein the second rim includes a second slot, wherein a first tab face of the tab portion extends radially through the second slot, and wherein the first tab face is coplanar with the second valve flange face.

* * * * *